BLOW MOLDING APPARATUS

Filed April 6, 1967 4 Sheets-Sheet 1

EDWIN W. FUERST
ROBERT B. MASON
INVENTORS

BY Paul Sullivan
ATTORNEY

EDWIN W. FUERST
ROBERT B. MASON
INVENTORS

BY Paul E. Sullivan
ATTORNEY

BLOW MOLDING APPARATUS

Filed April 6, 1967 4 Sheets-Sheet 3

EDWIN W. FUERST
ROBERT B. MASON
INVENTORS

BY Paul E. Sullivan
ATTORNEY

EDWIN W. FUERST
ROBERT B. MASON
INVENTORS

BY Paul C. Sullivan
ATTORNEY

United States Patent Office 3,398,428

Patented Aug. 27, 1968

3,398,428
BLOW MOLDING APPARATUS

Edwin E. Fuerst, Colrain, Mass., and Robert B. Mason, West Hartford, Conn., assignors to Monsanto Company, St. Louis, Mo., a corporation of Delaware Continuation-in-part of application Ser. No. 391,920, Aug. 25, 1964. This application Apr. 6, 1967, Ser. No. 644,424

6 Claims. (Cl. 18—5)

ABSTRACT OF THE DISCLOSURE

A blow molding apparatus having a multitude of sharply contoured protrusions in the extrusion outlet for imparting a grooved configuration to the surface of a parison formed in the outlet. The parison is expanded in a mold to form a container having a striated appearance, with the striated effect obtained by light reflecting from the surfaces of the walls of the grooves formed by the protrusions.

This application is a continuation-in-part of copending application Ser. No. 391,920, filed Aug. 25, 1964, and now abandoned.

The present invention relates generally to a new and useful apparatus for forming a plastic container, and more particularly to an apparatus for producing a unique parison from which a receptable having enhanced beauty and greater strength is molded.

Plastic container manufacturers are making increasingly greater inroads into fields normally occupied by the glass and paper industries as more economical and more efficient techniques become available for fabricating containers from this material. Container manufacturers are, however, constantly striving to produce a receptacle which will have enhanced sales appeal. Containers of this nature generally acquire sales appeal only at the sacrifice of some other desirable property or attribute, such as economical fabricating techniques.

It has now been discovered that a thermoplastic parison structure can be extruded with apparatus which eliminates the problems previously referred to, and which may be blow molded into a container having increased strength and enhanced aesthetic appeal without the necessity of resorting to expensive techniques, and with only nominal modifications to existing equipment.

In brief, an extrusion apparatus is provided wherein the extrusion outlet has a multitude of special, radially extending, closely spaced, sharply contoured projections, which impart a grooved configuration to the surface of a thermoplastic parison formed in the outlet. The space between the sides of adjacent protrusions within any particular area, at the point where they begin to extend radially from the surface from which they project, must be between 0 to ¾ times the maximum radial extension of the projection. After extrusion, the parison is expanded in a blow mold into a container having a unique, striated or rib-like appearance.

Apparatus has been provided in the past which utilizes a different type of discharge outlet, such as one having recesses extending generally perpendicularly away from the axis of the extrusion head, which tend to minimize the extent of grooving of the parison surface. The parison extruded therethrough has a few well spaced, rounded bulges on the surface, which are used for other purposes, i.e. to strengthen areas of maximum parison expansion. U.S. Patent No. 3,114,932 to Donnelly is typical of this type of appartus. However, such apparatus. is not suited for purposes of the present invention, since parisons formed thereby when expanded do not give the desired optical appearance in the finished container, because of the lack of a sudden, rapid, constant change in wall thickness from which light reflects to give the ribbed appearance. Apparatus for extruding parisons having a multitude of closely spaced, critically defined grooves which may be blow molded to produce containers of the character described, has been hitherto not appreciated in the art.

It is therefore a principal object of this invention to provide an apparatus for forming a receptacle or the like, possessing an unusual striated optical effect.

It is a further object of this invention to provide an apparatus for blow molding containers at a reduced weight while maintaining a high degree of recovery in the walls of the container.

It is a further object of this invention to provide a receptacle having enhanced sales appeal resulting from a visual effect caused by a varying wall thickness pattern in the receptacle.

These and other objects will become apparent from the following description when read in conjunction with the accompanying drawings.

In describing the overall invention, reference will be made to preferred embodiments of the apparatus illustrated in the accompanying drawings, in which.

Figure 1:
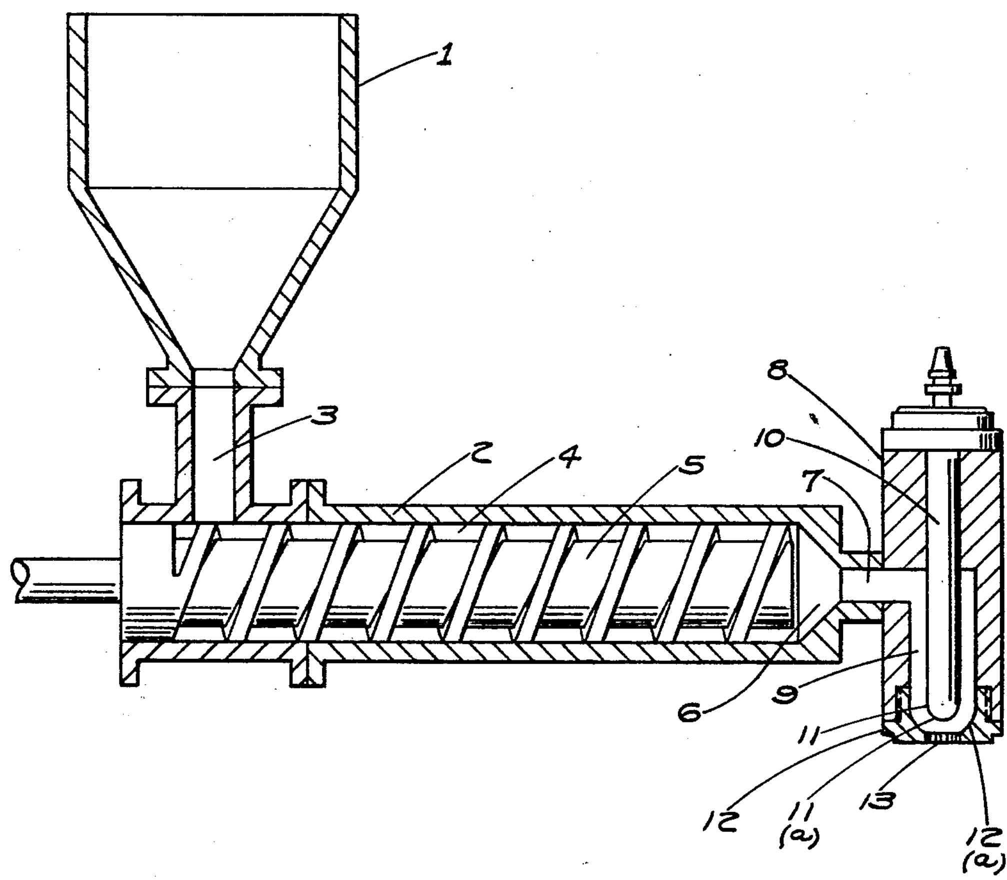
FIGURE 1 is a sectional, elevational showing of a preferred embodiment of an extrusion apparatus.
Figure 5A:
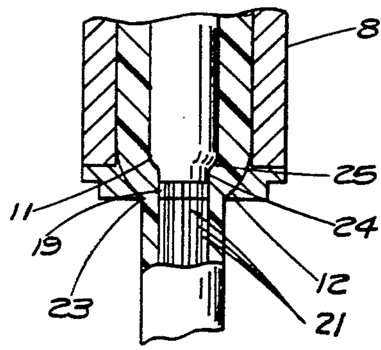
Figure 5B:
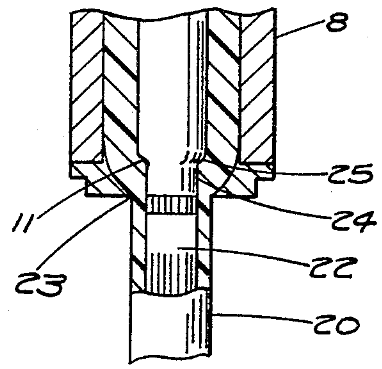

FIGURES 5(*a*) and 5(*b*) are sectional elevational showings of the extrusion outlet portion of another modified form of FIGURE 1.

FIGURES 6 to 14 are cross sectional parison views illustrating varying forms and shapes of parisons made in accordance with the apparatus of this invention.

Figure 15:
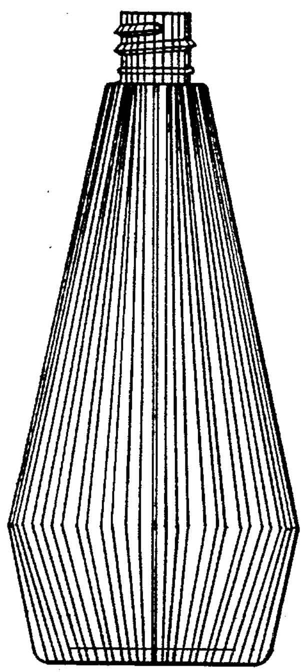

FIGURE 15 is an illustration of one form of container made in accordance with this inventon.

The extrusion apparatus illustrated in FIGURE 1 includes a conventional hopper 1 for supplying bulk plastic material to a schematically illustrated conventional plasticizer and feeding unit 2. Plasticizing unit 2 includes a material inlet 3, an elongate passage 4, a plastic material advancing and pressuring worm screw 5, and an outlet 6. Unit 2 would be surrounded with conventional heating units, not illustrated, to effect the plasticizing of materials being advanced through passage 4 by screw 5.

Outlet 6 terminates in an adjacent outlet 7 which communicates with the interior of the parison-forming unit 8. Parison-forming unit 8 includes a generally vertically extending bore 9 communicating with outlet 7. Mandrel 10 is mounted within bore 9 so as to define an annular cavity. At the lower end of the illustrated mandrel 10, there is mounted an extrusion tip 11 which provides an inner surface of a parison defining outlet. An extrusion ring 12 is spaced from the tip 11 defining the outer surface of this extrusion outlet.

Figure 2:
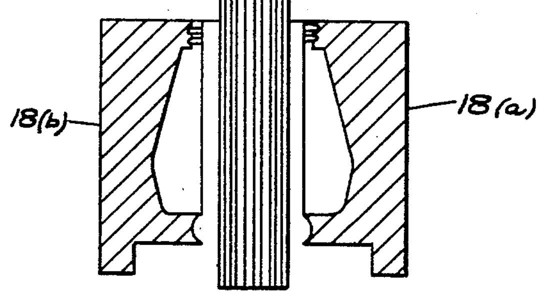
FIGURE 2 is a sectional, elevational and schematic showing of the extrusion outlet portion of FIGURE 1 and an accompanying blow mold.

Tip member 11 has a downwardly facing generally convex surface 11(*a*). Ring member 12 includes an upwardly facing generally concave surface 12(*a*). An opening 13 slightly greater than that of the outside diameter of tip member 11 extends from concave portion 12(*a*) in axial alignment with the tip. Plastic material extruded through the apparatus and passing through the extrusion outlet defined by the tip 11 and the ring 12 will issue from the opening 13 in the form of a hollow parison in the conventional manner recognized in the art. Extrusion ring 12 is characterized in this particular and preferred embodiment by a series of circumferentially spaced protrusions or teeth, 14, which extend radially inward from a short, axially extending cylindrical surface between the concave inner surface of the extrusion ring and the outer surface thereof. These protrusions, conversely, impart circumferentially spaced axially extending grooves 16 to the parison along its outer periphery, as illustrated in FIGURE 2.

Reviewing the apparatus in overall perspective, it will be appreciated that at the left end of illustrated screw 5 there is provided a source of plastic material. At the opposite end of the apparatus, an extrusion outlet is defined by cooperating ring 12 and tip 11. Plasticizer passage 4, connecting passage 7 and the annular passage encircling mandrel 10 afford a continuously open feed cavity for maintaining communication between the plastic material being fed and the extrusion outlet 13.

Figure 3:
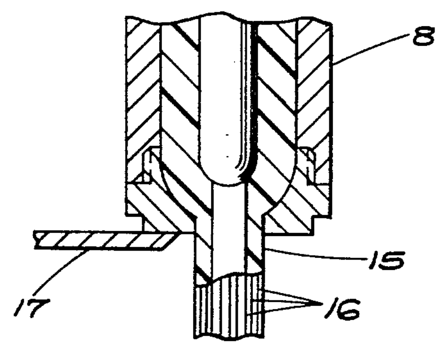
FIGURE 3 is a sectional elevational schematic showing of a preferred embodiment of a blow mold in closed position.
Figure 3:
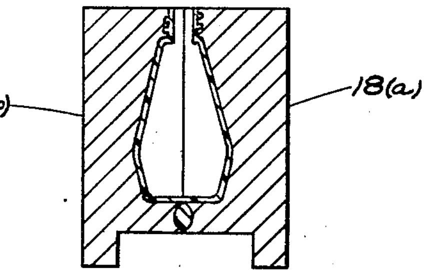
Figure 6:
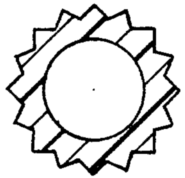
Figure 7:
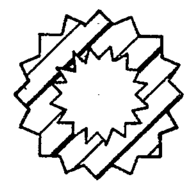

The extruded, grooved parison, a cross-section of which is illustrated in FIGURE 6, is then introduced into a suitable mold for formation into a useful article. In the particularly preferred embodiment illustrated in FIGURE 2, the parison is transferred between open mold members to the position illustrated. Thereafter, the mold members 18(*a*) and 18(*b*) are closed, and a cut-off or shearing blade 17 adapted to move transversely across the outer end of the cavity severs the connection between the plastic in the mold and the extrusion outlet. The mold is closed about the parison while pinching in the joint thereof, the exteriorly projecting portion of the parison. The pinched parison is thereafter blown by air pressure into surface contact with the smooth mold cavity walls as illustrated in FIGURE 3. This type of operation is well known in the art and is subject to many variations in the type of blowing technique employed, as well as in the particular series of sequential operations performed upon the parison in blow molding the parison into a finished article. Reference may be made to U.S. 2,669,752, U.S. 2,239,177, U.S. 2,975,473, and U.S. 2,597,558 in this regard.

One example of a finished receptacle is illustrated in FIGURE 15, and consists of a top wall having an upstanding tubular neck, a bottom wall and a side wall; the walls being characterized by a series of striations or rib-like circumferentially spaced grooves extending from the neck to the bottom wall. The exterior walls of the container will, in many instances, feel essentially smooth to the touch in portions wherein the parison undergoes substantial stretching during the blowing operation, although the striae are still clearly visible. This effect is caused by the pressure of the air or other fluid medium used to blow the parison against the mold cavity. Thus even though grooves may be present only on the outside of a parison formed in the manner illustrated in FIGURE 2, they will appear on the inside of the finished container, except in those areas in which there is practically no blow up of the parison, such as the neck area, for example. Due to different angles of light reflecting from the surfaces of the grooves, a visual effect of alternating shades of color is produced although obviously the parison used to produce this effect is but one color throughout. As a result of this unusual optical effect, the finished receptacle emanates a quality of luxury not generally associated with synthetic plastic containers, and one which is achieved at a virtually negligible cost increase over plastic containers presently available.

Figure 4:
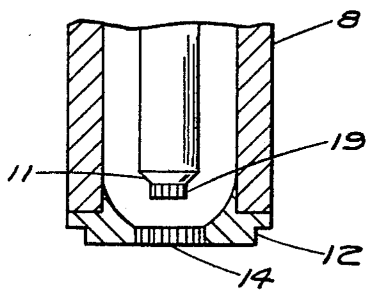
FIGURE 4 is a sectional elevational showing of the extrusion outlet portion of a modified form of FIGURE 1.

FIGURE 4 illustrates a modification of the embodiment illustrated in FIGURE 1 wherein both the ring member 12 and the tip member 11 have circumferentially spaced axially extending projections. As becomes readily apparent, projections 19 spaced along tip 11 will impart a series of spaced grooves to the inner periphery of the parison, as illustrated in cross section in FIGURE 7. This parison, when molded by a technique such as that shown in FIGURES 2 and 3, will form a receptacle having a striated, rib-like configuration extending along the length of the container from the neck portion, along the side wall and to the bottom portion of the container. These grooves enable the receptacle to be blown at a reduced weight and still maintain a substantial degree of recovery to the walls of the container.

FIGURES 5(*a*) and 5(*b*) illustrate still another modification in the techniques heretofore illustrated. In FIGURE 5(*a*), ring member 12 contains no means for imparting axially extending grooves but consists of a conventional opening which imparts a smooth finish to the outer wall of the parison 20. Tip 11, on the other hand, imparts a series of circumferentially spaced, axially extended grooves 21 to the inner walls of the parison 20. Referring now to FIGURE 5(*b*), it can be seen that by advancing the mandrel in an axially downward direction relative to the orifice of the ring member, tip member 11 will no longer impart grooves to the inner wall of the parison, as illustrated at 22. Thus, through the use of a ring and tip arrangement such as that illustrated in FIGURES 5(*a*) and 5(*b*), a parison may be extruded having axially spaced grooved portions at selected intervals along the inner wall of the parison.

Figure 13:
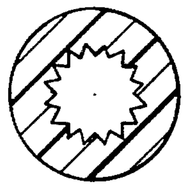
Figure 14:
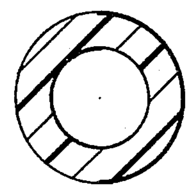

When the tip 11 is positioned so that outermost tip portion 19, which has a series of radial projections, cooperates with the circular orifice defining ring portion 23, a parison cross sectional configuration as shown in FIGURE 13 results when plastic is extruded. After extruding a section of the parison having a cross section as shown in FIGURE 13, the tip 11 may then be lowered so as to cause the intermediate portion 24 which has a smooth surface to cooperate with the orifice defining ring portion 23. With this tip positioning, there would be extruded a parison portion having a cross sectional configuration as shown generally in FIGURE 14. Should it be desired to extrude a parison having an enlarged inside diameter, the tip member 11 may be further lowered to cause the inner tip portion 25 to cooperate with the orifice defining ring portion 23. The enlarged size of this portion of the tip in relation to the intermediate tip portion 24 would cause an increase in the parison inside diameter. This manner of varyingt he inside diameter of a parison, as well as a means for imparting reciprocal axial motion to the mandrel is more fully described in U.S. Patent No. 3,217,360, and the various means described therein for imparting reciprocal axial motion to a mandrel are incorporated herein by reference. Obviously, this invention is not limited to any particular method of varying the geometry of the extrusion outlet to impart an alternate sequence of grooves and smooth areas to the internal walls of the parison.

The above described manner of selectively varying the inner wall geometry of a parison to provide alternate grooves and smooth sections opens up numerous possibilities in desgining a receptacle or other hollow body. For example, the container may be formed having striae extending only on a selected portion of a container or a hollow body may be produced having a sequence of alternate striae and smooth sections. Numerous other variations will readily occur to one skilled in the art.

FIGURES 8–12 illustrate additional modifications which will impart other optical effects to the physical container as well as providing structural strength at any desired point along the receptacle. Obviously the ring and tip members will be varied with respect to the radial length of the projection and the shape and position of the projections around the periphery of their respective members to correspond to the desired shape in the parison as it emerges from the extrusion outlet.

Figure 8:
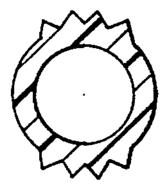
Figure 9:
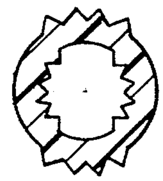
Figure 11:
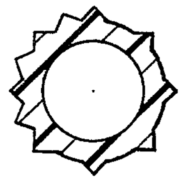
Figure 10:
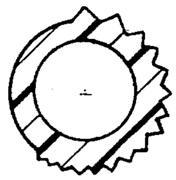
Figure 12:
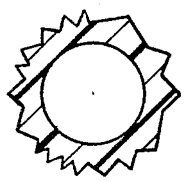

FIGURES 8 and 9 illustrate embodiments wherein the grooves extend only partly around the parison. FIGURE 10 illustrates an embodiment wherein the grooves are of unequal depth around the periphery of the parison, while FIGURE 11 illustrates a parison in which the grooves are unequally spaced around the periphery of the parison. FIGURE 12 illustrates a parison in which the distance between the grooves from trough to trough varies around the perimeter of the parison. Many other modifications will readily occur to one skilled in the art.

One of the principal attributes of this unusual apparatus resides in the previously mentioned observations that receptacles produced in accordance with this invention possess an unusual optical effect caused by the variation in wall thickness at different intervals in the final article. Depending upon the particular shape of the receptacle formed within the mold, the ribs tend to flatten out at areas in which the parison is stretched to accommodate the the wider portions of the mold. Accordingly, since the light is reflected through different angles at different sections of the receptacle, a visual effect is created which tends to produce an illusion of color shading.

The structurally simple mechanism for producing these receptacles is of considerable importance. Its operation may be effected with only nominal modifications of existing extrusion equipment by simply replacing the conventional tip member and/or ring member with one having the desired radial protrusions. A particularly significant advantage attributable to this invention is that no modification need be made in the conventional blow molding equipment to produce these receptacles. Accordingly, the expenses involved in providing new molds to produce bottles or receptacles having a new and unusual finish are obviated.

As a feature of the invention, the value of the additional strength in the walls of the container by the placement of vertcial ribs positioned at set intervals is apparent, as is the advantage of producing a bottle at a reduced weight.

The essential projections in the extrusion outlet of the present invention must have adequate depth (radial direction) to produce the desired groove in the parison for achieving the finished article light reflection pattern. This depth will vary with the parison wall thickness, but for most parisons the total radial depth of the projections must be between 0.20 to 0.90 times the total thickness of the parison wall inclusive of the grooves, and preferably between about 0.5 to 0.7 times the total parison wall thickness. Or considered in another way, the total radial depth of a projection must be between about 0.20 to 0.90 times the clearance in a radial direction between the base of the projection and the opposing wall of the extrusion outlet, or mandrel tip as the case may be and preferably 0.5 to 0.7 times this clearance.

The position of the projections in the extrusion outlet, and of the grooves in the parison surface may be varied depending on the extent of the optical effect desired in the finished container. Within any particular area around the periphery, of either the tip member or ring, the projections must be multitudinous, i.e. in excess of about five. For any particular multitude of projections in the extrusion outlet, however, the space between the sides of adjacent protrusions, at the point where they begin to extend radially from the surface from which they project, whether this be on the extrusion ring or mandrel tip, must be between 0 to ¾ times the maximum radial length of the projection. Optimum results are obtained when the projections are in adjoining, abutting relationship, symmetrically spaced around the periphery, and preferably around the full extent of the outlet periphery. It is preferred, however, that for typical total parison wall thickness ranges between about 0.01 to 0.15 inch, inclusive of the groove depth, that the projections in the outlet in any particular area, be provided at the rate of about 20 to 75 projections per inch of periphery of either the mandrel tip or cylindrical ring surface, and preferably between about 35 to 50.

As previously mentioned, it is essential for purposes of the present invention that the extremities of the walls or sides of the projections be as sharply cornered or contoured as possible. This is necessary so as to distinctly and abruptly define the various differing wall thicknesses from which light reflects to provide the desired ribbed appearance in the molded article. Otherwise any projection shape fulfilling these requirements may be used, as, for example, V-shaped, rectangular, square etc. An inverted V-shaped design having sharp peaks and valleys has been found to give optimum results.

It is likewise important in the apparatus of the present invention that the radial protrusions of the extrusion outlet extend axially of the outlet orifice through which the parison finally emerges. The axial length of the protrusions is preferably short and maintained between about 0.005 to about 0.075 inch. Lengths in excess of this tend to eliminate any puff out of the parison on passage through the orifice, since with such lengths stresses within the parison which are responsible for the puff out have a greater tendency to equalize. Puffing of the parison is preferable since it permits use of extrusion tooling which is smaller than the diameter of the parison which is eventually expanded in the mold.

Obviously many variations in the apparatus disclosed will become apparent to one skilled in the art. For example, it is possible to vary the internal and external shape of the parison to produce, for example, an oval shaped parison rather than one of generally circular configuration. In addition, many other blow molding techniques may be employed in extruding a parison into the shape of a container, such as those illustrated in copending applications Serial No. 327,789, Serial No. 324,398, and Serial No. 323,420, all of which are assigned to Monsanto Company.

While the apparatus disclosed in the invention has been described with reference to preferred embodiments, additional modifications will readily occur to those skilled in the extruding arts. For example, a plasticizing structure other than the structure schematically illustrated may be employed. Additionally, depending upon the particular parison shape desired, the extrusion outlet may assume other shapes which will impart a striated, rib-like effect to the parison. For example, grooves may be imparted to the parison by pins or other projections extending from the ring or tip. It is also within the scope of this invention to produce axially or radially extending grooves in the parison after it has emerged from the extrusion outlet and prior to its introduction into the mold.

In addition, relative changes in the position of the tip and ring may be accomplished by movement of the ring rather than the tip, if desired. It is also possible to produce alternate grooved and smooth sections on the outer wall of the parison, as well as the inner wall of the parison.

Other modifications will readily occur to practitioners which would be well within the scope of the invention as defined in the appended claims.

What is claimed is:

1. An apparatus for forming a thermoplastic container having circumferentially closely spaced, axially extending striations comprising:
  (a) a source of plastic material;
  (b) an extrusion nozzle comprising an extrusion ring having an outlet orifice therein and a tip member spaced from and positioned within said ring;
  (c) interrupting means in the extrusion nozzle comprising protrusions extending radially into the peripheral space between the extrusion ring and tip member, such that the open area of a cross section of the axial length between the extrusion ring and tip member taken through the interrupting means is less than the open area of a cross section of the axial length in said extrusion nozzle taken on the upstream side adjacent said interrupting means, whereby said protrusions dig into the surface of thermoplastic material as it moves longitudinally through said open area between the extrusion ring and tip member across said protrusions toward the orifice of the extrusion ring, said protrusions ranging in number between about 20 to 75 per peripheral inch of surface of the outlet orifice of the extrusion ring, said protrusions being longitudinally positioned in the extrusion nozzle such that their outer axial ends abut against the surface of a plane taken across the axis of the extrusion nozzle and lying against the outer surface of the outlet orifice of the extrusion ring, said protrusions being situated with respect to each other such that the peripheral distance between the bases of immediately adjacent protrusions is between 0 to ¾ times the maximum radial extension of either of the immediately adjacent protrusions;

(d) a cavity including an open passage means connecting said source and said extrusion nozzle;

(e) means for causing said thermoplastic material to flow through said cavity and across said protrusions in said extrusion nozzle to form a parison having circumferentially closely spaced, axially extending grooves on its surface; and (f) means for expanding said parison against the smooth walls of a blow mold, thereby substantially flattening in at least a portion of the parison, the projections formed by the walls of the grooves in the parison surface to form said container having circumferentially closely spaced, axially extending striations.

2. Apparatus as recited in claim 1 wherein said protrusions have substantially the shape of an inverted V in plan view in that each tapers abruptly outwardly away from a cylindrical surface in the extrusion nozzle to an apex, and then reversely tapers inwardly from the apex to the cylindrical surface.

3. Apparatus according to claim 2 wherein said protrusions are on the ring member.

4. An apparatus for forming a thermoplastic container having circumferentially closely spaced, axially extending striations comprising:

(a) a source of thermoplastic material;

(b) a parison forming unit comprising:

(I) a vertically oriented housing having an axially extending bore therein;

(II) a mandrel mounted within the bore defining an annular passageway between the housing and mandrel;

(III) an extrusion nozzle in the lower end of the housing comprising:

(1) an extrusion ring connected to the housing, having an upwardly facing, generally concave inner surface, and an outlet orifice extending between the inner and outer surfaces of said extrusion ring;

(2) a tip member on the end of the mandrel spaced from and positioned within said concave inner surface of the extrusion ring, to define an annular passageway in said extrusion nozzle and having a downwardly facing generally convex portion aligned with said outlet orifice;

(IV) interrupting means on the extrusion ring comprising protrusions ranging in number between about 20 to 75 per peripheral inch of surface of the outlet orifice, said protrusions extending radially into the outlet orifice of the extrusion ring from the orifice wall such that the open area of a cross section of the axial length of the annular passageway taken through the interrupting means is less than the open area of a cross section of the axial length of the annular passageway taken above the interrupting means, whereby said protrusions dig into the surface of thermoplastic material as it passes through said annular passageway across said protrusions toward the outlet orifice, said protrusions being situated with respect to each other such that the peripheral distance between the bases of immediately adjacent protrusions is between 0 to ¾ times the maximum radial extent of either of the immediately adjacent protrusions (c) plasticizing means for forcing said thermoplastic through said annular passageway of said parison forming unit and across said protrusions in the extrusion nozzle to form a parison having on its outer periphery circumferentially closed spaced, axially extending grooves; and (d) means for expanding said parison against the smooth walls of a blow mold thereby substantially flattening the projections defined by the walls of the grooves in the parison surface to form said container having circumferentially closely spaced, axially extending, striations.

5. Apparatus according to claim 1 wherein the extent of radial projection of said protrusions is between 0.20 to 0.90 times the total thickness of the wall of the parison prior to expansion in the mold.

6. Apparatus according to claim 1 wherein the longitudinal extent of the protrusions is between about 0.005 to 0.0075 inch.

References Cited

UNITED STATES PATENTS

| | | | |
|---|---|---|---|
| 2,750,631 | 6/1956 | Johnson. | |
| 3,114,932 | 12/1963 | Donnelly | 18—14 |
| 3,217,360 | 11/1965 | Mason et al. | 18—14 |

WILBUR, McBAY, *Primary Examiner.*